May 29, 1945.        H. MOHR        2,377,169
CORRUGATED METAL FASTENER
Filed April 28, 1944
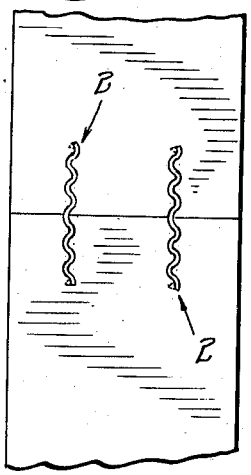
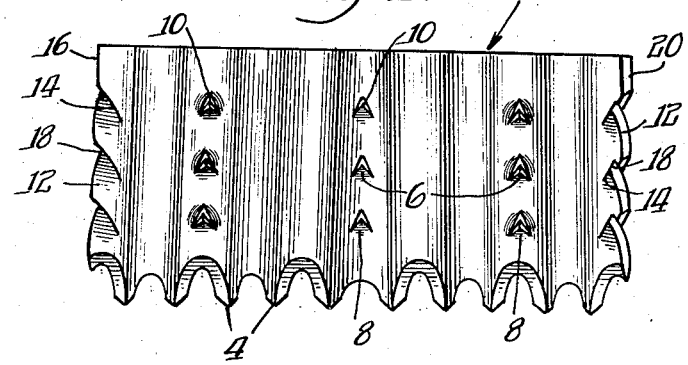
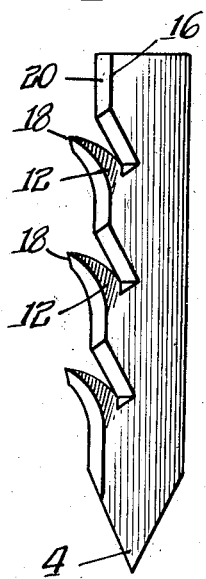
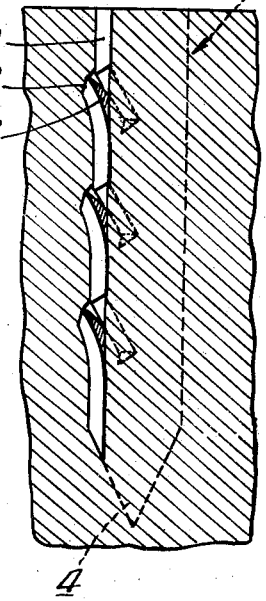
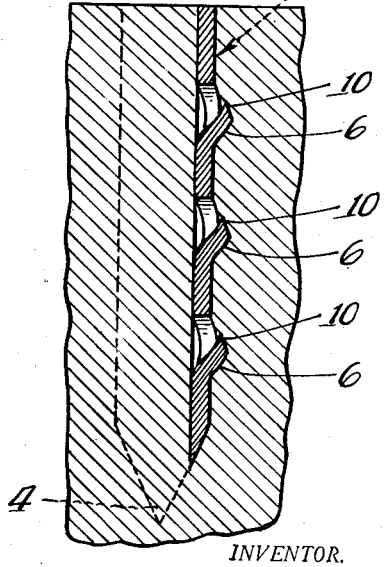
INVENTOR.
Henry Mohr
By: Loftus, Moore, Olson and Trexler
attys.

Patented May 29, 1945

2,377,169

UNITED STATES PATENT OFFICE 2,377,169

CORRUGATED METAL FASTENER

Henry Mohr, Hutchinson, Kans.

Application April 28, 1944, Serial No. 533,111

1 Claim. (Cl. 85—11)

This invention relates to corrugated metal fasteners for joining two pieces of wood such as shelves in edge to edge relation.

This application is a continuation-in-part of my application filed October 14, 1941, Serial No. 414,948.

Corrugated fasteners as heretofore provided are not satisfactory in respect to their ability to maintain joined wood pieces, such as wooden shelves, against relative shifting or sliding vertically of the fastener so that the joint becomes uneven or disrupted entirely.

It is accordingly an object of my invention to provide a corrugated fastener so constructed as to permanently interlock with the wooden shelves and prevent this relative shifting of the joined pieces vertically of the fastener so as to maintain the joint even and the joined pieces in a coplanar relation.

More specifically, it is an object of my invention to provide a corrugated fastener having yieldable, resilient prongs or barbs which readily yield to permit easy driving of the fastener into the pieces to be joined and spring outward, biting into the wood and interlock the joined pieces against relative shifting by tending to bite more firmly into the wood as the pieces tend to shift so that on the slightest degree of shift the barbs bite more deeply into the wood, thus increasing the locking power of the fastener against the tendency of the pieces to shift.

Other and further objects and advantages of my invention will become apparent in the following description when taken in connection with the accompanying drawing, wherein:

Figure 1 is a plan view showing two pieces of wood shelves interlocked edge to edge by a corrugated fastener embodying my invention;

Figure 2 is a side view in elevation of the corrugated fastener shown in Figure 1;

Figure 3 is a top plan view of the fastener;

Figure 4 is an end view in elevation of the fastener;

Figure 5 is an enlarged view similar to Figure 4 illustrating the manner in which the end prongs bite into the wood;

Figure 6 is an enlarged view in vertical section showing the manner in which the prongs bite into the wood.

As shown in the drawing, the corrugated fastener embodying the invention comprises a corrugated sheet metal body 2 having a sharpened lower edge or sharpened teeth 4 facilitating the entrance of the fastener into the wood and facilitating the driving of the fastener thereinto.

Each of a number of the corrugations of the body 2, on both sides thereof, is provided with a series of vertically spaced prongs or barbs 6 projecting outwardly from the apex of the corrugation. Each barb or prong has a relatively wide base portion 8 from which the triangularly shaped barb projects upwardly and outwardly to a relatively sharp point 10 so that each barb is resilient. At each end the corrugated body is provided with a series of barbs 12 formed by edge cuts or kerfs 14 extending diagonally downward at a sharp angle to the end edge 16 of the fastener. Each barb 12 is thus provided with a sharp tooth or prong 18 at its upper outer edge and with a relatively wide base portion or connection to the body of the fastener. The pointed or pronged end of each barb is formed out of the plane of the edge 20 of the fastener body and at an angle thereto as best illustrated in Figures 4 and 5. These prongs are integral with the body 2 and so formed on the end thereof at an angle to the body as to provide a spring-like section of a high-degree of resiliency so as to afford at all times automatically a tendency of the prongs to exert an outward pressure into the wood or shelves once the fastener has been driven home and thus set up a pronounced bite into the wood and automatically interlock the fastener and shelves against relative movement one with respect to the other and interlock and maintain the shelves in the desired or predetermined plane.

When the fastener is driven into the wood pieces the prongs yield inwardly or toward the body of the fastener and approach the plane of the body in the area from which they are formed and thus permit a ready driving of the fastener into the wood. Since the teeth yield inwardly on the driving of the fastener, the hole cut into the wood by the entrance of the fastener substantially conforms and closely approximates the shape of the body portion and the cutting of grooves in the wood by the barbs is minimized. The barbs, being highly resilient, spring outwardly into the fibers of the wood adjacent this opening, and actually bite into the adjacent wood sections as shown in Figures 1, 5 and 6. As indicated in Figures 5 and 6, the prongs or barbs always maintain contact with the fiber of the wood and by the lateral penetration into the wood fiber prevent relative vertical shifting of the wood and fastener in the fastener withdrawing direction, i. e. in a direction which would cause the fastener to recede from the wood and project above the surface into which it has been driven. Relative movement of the wood pieces and fastener in the opposite direction, i. e. in the direction which would cause the fastener to penetrate more deeply into the pieces, is of course prevented by the unpenetrated wood beneath the fastener.

As the wood ages, dries out, or becomes wet and dries out, it tends to shrink away from the body of a corrugated fastener. As this occurs the end prongs being resilient and projecting outwardly at an angle from the body of the fastener, and at the ends of the fastener, constantly press into the wood, moving outwardly more and more as the wood shrinks. Thus these barbs prevent withdrawing movement of the fastener notwithstanding shrinkage of the wood and permanently interlock the fastener and wooden shelves or parts together in a predetermined plane.

While certain specific structural details have been disclosed and described herein for the purpose of illustrating certain embodiments of my invention, it will be apparent that other modifications and changes may be made without departing from the spirit and scope of the appended claim.

I claim:

A sheet-like metal fastener for securing and maintaining together two aligned pieces of wood end to end having driving and entering edges, a plurality of relatively sharp spaced barbs along the entire edge of each side, corrugations extending between said edges and from the crests of a corrugation, said barbs having relatively sharp upper edges and being joined to the fastener body by relatively wide base portions to permit the barbs to yield inwardly on driving of the fastener into a wood piece and spring outwardly to penetrate the wood fibers to prevent relative withdrawal movements of the piece and fastener.

HENRY MOHR.

CERTIFICATE OF CORRECTION.

Patent No. 2,377,169.  May 29, 1945.

HENRY MOHR.

It is hereby certified that error appears in the printed specification of the above numbered patent requiring correction as follows: Page 2, second column, lines 11 and 12, in the claim, strike out the words and comma "from the crests of a corrugation,"; and that the said Letters Patent should be read with this correction therein that the same may conform to the record of the case in the Patent Office.

Signed and sealed this 23rd day of October, A. D. 1945.

Leslie Frazer (Seal)  First Assistant Commissioner of Patents.